(12) United States Patent
Pettitt et al.

(10) Patent No.: US 7,737,989 B2
(45) Date of Patent: Jun. 15, 2010

(54) SYSTEM AND METHOD FOR COMPUTING COLOR CORRECTION COEFFICIENTS

(75) Inventors: Gregory S. Pettitt, Farmersville, TX (US); Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 865 days.

(21) Appl. No.: 11/588,921

(22) Filed: Oct. 27, 2006

(65) Prior Publication Data

US 2008/0100639 A1    May 1, 2008

(51) Int. Cl.
| | |
|---|---|
| *G09G 5/00* | (2006.01) |
| *G09G 5/02* | (2006.01) |
| *H04N 9/04* | (2006.01) |
| *H04N 5/74* | (2006.01) |
| *H04N 9/28* | (2006.01) |
| *G03F 3/08* | (2006.01) |
| *G06K 9/00* | (2006.01) |
| G06K 9/40 | (2006.01) |
| G06K 9/36 | (2006.01) |
| H04N 1/46 | (2006.01) |

(52) U.S. Cl. ............... 345/589; 345/581; 345/207; 345/600; 345/606; 348/269; 348/602; 348/759; 348/807; 358/504; 358/516; 358/518; 358/525; 382/162; 382/254; 382/167; 382/276

(58) Field of Classification Search ............ 345/84–88, 345/207, 428, 581, 589–591, 593, 597, 600–606, 345/549, 690; 348/227–228, 268–269, 441, 348/496, 557, 602, 750–751, 758–761, 807–808; 382/162–167, 254, 274, 276, 300; 358/518–525, 358/504, 509–512, 516

See application file for complete search history.

(56) References Cited

U.S. PATENT DOCUMENTS

| | | | |
|---|---|---|---|
| 4,566,935 | A | 1/1986 | Hornbeck |
| 4,615,595 | A | 10/1986 | Hornbeck |
| 4,662,746 | A | 5/1987 | Hornbeck |
| 5,061,049 | A | 10/1991 | Hornbeck |
| 5,083,857 | A | 1/1992 | Hornbeck |
| 5,096,279 | A | 3/1992 | Hornbeck et al. |
| 5,583,688 | A | 12/1996 | Hornbeck |
| 6,231,190 | B1 | 5/2001 | Dewald |

(Continued)

OTHER PUBLICATIONS

Hutchison, D.C., "Introducing BrilliantColor™ Technology," Texas Instruments DLP® Products, Dec. 29, 2005, 5 pp., Texas Instruments, Dallas, TX.

*Primary Examiner*—Wesner Sajous
(74) *Attorney, Agent, or Firm*—Charles A. Brill; Wade James Brady, III; Frederick J. Telecky, Jr.

(57) ABSTRACT

System and method for computing coefficients for color correcting rendered colors used in displaying images. A preferred embodiment comprises measuring color values of light output for a display system, receiving color values of desired colors, and computing a color correction matrix based on the measured color values and the input color values. The color correction matrix may be used to modify color commands to a light engine of the display system. The modifications to the color commands permit the storage and use of a set of color commands designed for a reference display system, simplifying display system design and manufacture.

17 Claims, 6 Drawing Sheets

U.S. PATENT DOCUMENTS

| | | |
|---|---|---|
| 6,342,898 B1 | 1/2002 | Pettitt |
| 6,536,904 B2 | 3/2003 | Kunzman |
| 6,594,387 B1 | 7/2003 | Pettitt et al. |
| 2002/0122044 A1* | 9/2002 | Deering ..................... 345/597 |
| 2003/0098916 A1* | 5/2003 | Noguchi ..................... 348/272 |
| 2004/0119860 A1* | 6/2004 | Vogel et al. ................ 348/272 |
| 2006/0098077 A1* | 5/2006 | Dowling ..................... 347/130 |
| 2006/0104058 A1* | 5/2006 | Chemel et al. .............. 362/231 |
| 2006/0208983 A1* | 9/2006 | Lee et al. ..................... 345/89 |
| 2006/0221019 A1* | 10/2006 | Morgan et al. ................ 345/84 |
| 2007/0024529 A1* | 2/2007 | Ben-David et al. ............ 345/32 |
| 2007/0126754 A1* | 6/2007 | Edge ........................ 345/593 |
| 2007/0216772 A1* | 9/2007 | Xu et al. .................... 348/189 |
| 2009/0190045 A1* | 7/2009 | Endo et al. .................. 348/760 |

* cited by examiner

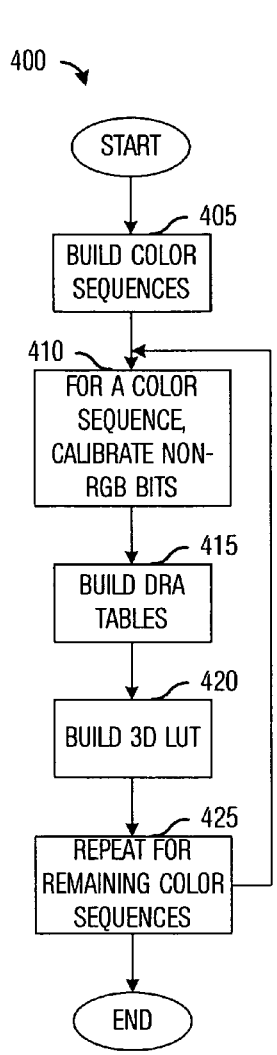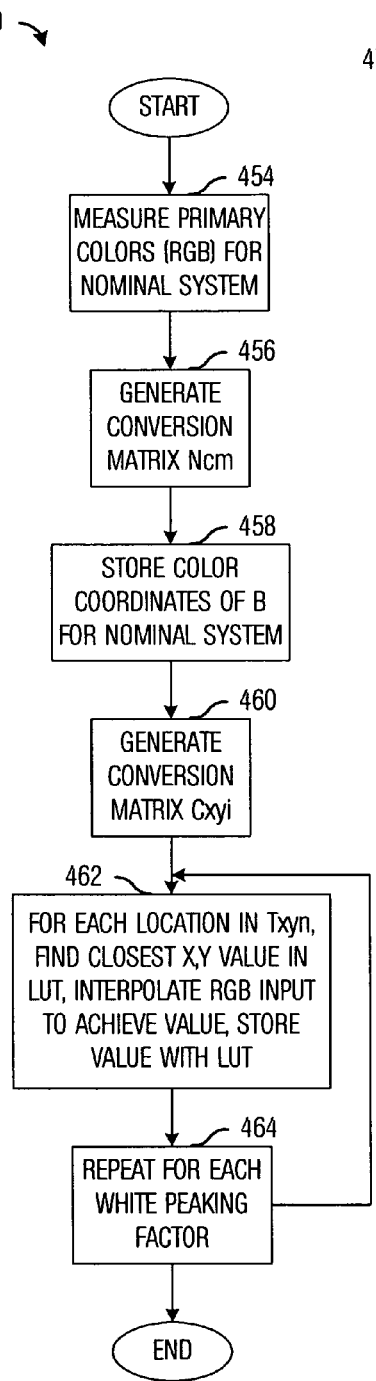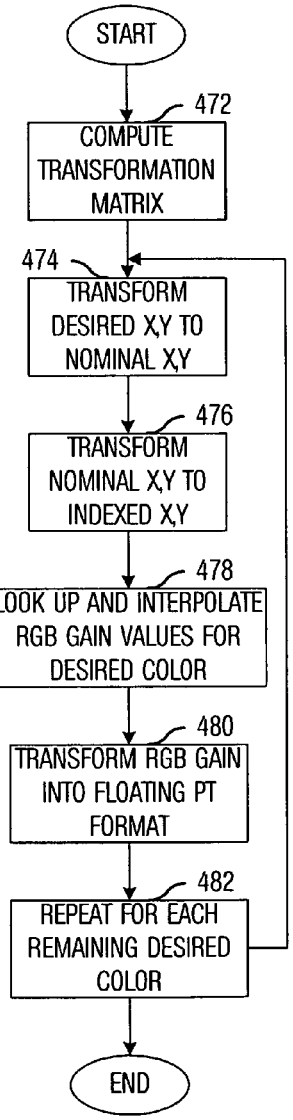
Fig. 4a
Fig. 4b
Fig. 4d

500

SYSTEM AND METHOD FOR COMPUTING COLOR CORRECTION COEFFICIENTS

TECHNICAL FIELD

The present invention relates generally to a system and a method for displaying images, and more particularly to a system and a method for computing coefficients for color correcting rendered colors used in displaying images.

BACKGROUND

When developing a display system for subsequent manufacture and sale, the display system manufacturer will often create a reference display system that is used to develop the display system hardware and software. The reference display system and its hardware and software are tweaked along with system settings, such as configuration parameters, conversion coefficients, and so forth, with the end result being a display system that meets image quality standards. Such a reference display system is commonly referred to as a "golden display system" or a "golden projector."

The golden projector's hardware, software, and tweaked system settings generally are used as the standard to which the subsequently manufactured display systems will be built. Although the manufacturer will attempt to exactly duplicate the golden projector, manufacturing variances will normally prevent the creation of exact duplicates. Software and system settings generally may be exactly duplicated since they simply can be copied from the golden projector and stored in memory in the manufactured display system. Mechanical systems, such as the optical system of the display system, however, do not lend themselves to duplication without variation. These variations in the mechanical systems, especially in the optical system, can result in a visually noticeable difference between images displayed by the golden projector and images displayed by the other manufactured display systems. Because of the manufacturing differences between the manufactured display systems and the golden projector, additional tweaking of the manufactured display systems may need to be performed to bring them to the standards of the golden projector.

With reference now to FIGS. 1a and 1b, there are shown data plots illustrating CIE 1931 xy chromaticity diagrams for a golden projector (FIG. 1a) and an exemplary manufactured display system (FIG. 1b). The diagram shown in FIG. 1a shows a color space 105 of the golden projector as determined by the location of the golden projector's red point 110, blue point 120, and green point 115 in conjunction with the intensity of the light provided at each of these primary colors. A white point 125 is located at the intersection of lines connecting the primary colors and secondary colors, which are a weighted combination of the primary colors.

The diagram shown in FIG. 1b shows a color space 155 of an exemplary display system and its red point 160, blue point 170, and green point 165. The red point 160, the blue point 170, and the green point 165 of the exemplary display system may be the same as the red point 110, the blue point 120, and the green point 115 of the golden projector. Due to changes in relative intensity, however, secondary color points as well as white point 175 may be shifted.

Therefore, one disadvantage of the prior art is that the images displayed by the exemplary display system may have a different color cast from the same images displayed on the golden projector. Another disadvantage of the prior art is that these variations between display systems may be noticeable and unacceptable to the sellers and purchasers of the display systems.

SUMMARY OF THE INVENTION

These and other problems are generally solved or circumvented, and technical advantages are generally achieved, by preferred embodiments of the present invention which provides a system and a method for computing coefficients for color correcting rendered colors used in displaying images.

In accordance with a preferred embodiment of the present invention, a method for color-correcting colors in a display system comprises measuring output color values of light output for the display system, receiving desired color values of desired colors, computing a color correction matrix based on the measured output color values and the desired color values, and modifying color commands to a light engine of the display system using the color correction matrix.

In accordance with another preferred embodiment of the present invention, a system for a light source to produce light responsive to received light commands comprises an array of light modulators configured to produce images on a display plane by modulating the light from the light source based on image data, a controller coupled to the array of light modulators and to the light source, the controller configured to process color information and to correct color values based on a reference color space, and an optoelectric sensor coupled to the controller, the optoelectric sensor configured to provide to the controller chromatic information associated with the light from the light source.

In accordance with another preferred embodiment of the present invention, a method of manufacturing a display system comprises installing a light engine configured to generate multiple colors of light, installing a spatial light modulator in a light path of the multiple colors of light, installing a controller configured to control the light engine and the spatial light modulator, measuring output color values of a light output of the display system, receiving desired color values of desired colors, computing a color correction matrix based on the measured output color values and the desired color values, and storing the color correction matrix in a memory in the display system.

An advantage of a preferred embodiment of the present invention is that it is compatible with systems having non-linear processing present in color enhancement algorithms.

Another advantage of a preferred embodiment of the present invention is that it may be utilized in multiprimary display systems, as well as RGB display systems, giving it wide applicability different display systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a through 4e are flow charts illustrating the creation of a three-dimensional look-up table used in color correction and color boosting, according to a preferred embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a display system using a DMD-based microdisplay. The invention may also be applied, however, to other display systems using microdisplays, such as those using deformable micromirrors, transmissive and reflective liquid crystal displays, liquid crystal on silicon displays, and so forth.

Figure 1A:
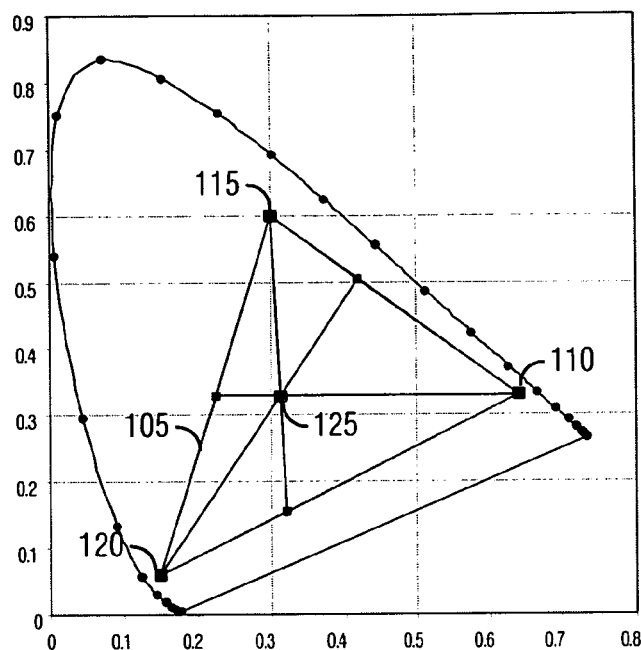
FIGS. 1a and 1b are xy chromaticity graphs for a golden projector and an exemplary display system, respectively.
Figure 1B:
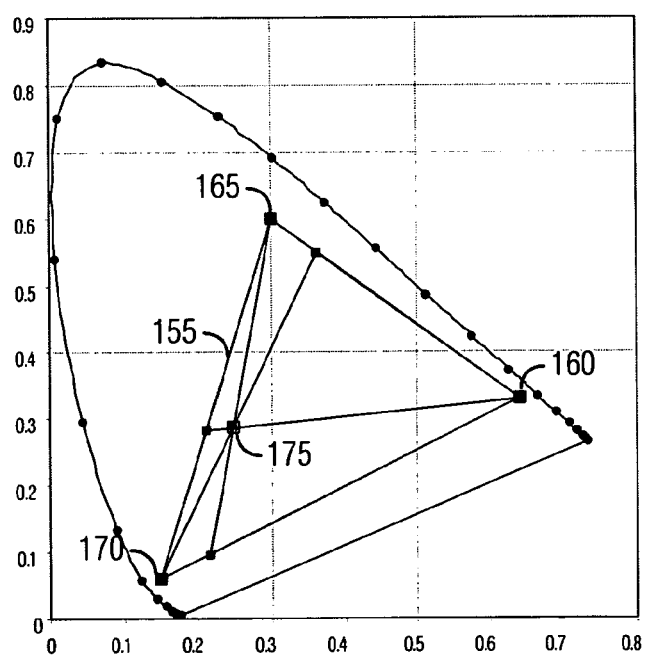
Figure 2A:
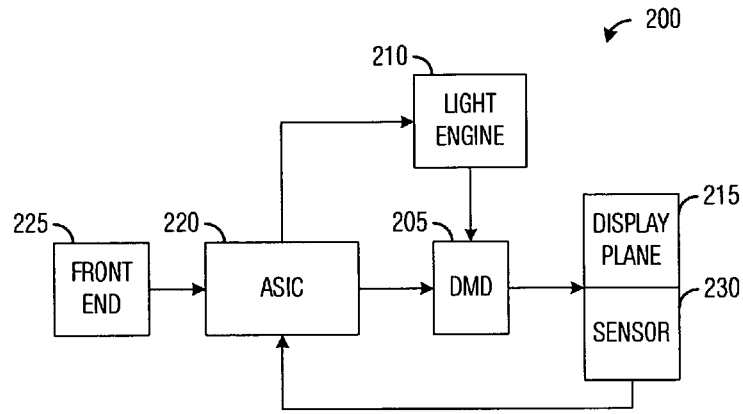
FIGS. 2a through 2c are block diagrams of DMD-based display systems, according to a preferred embodiment of the present invention.

With reference now to FIG. 2a, there is shown a high level block diagram of a DMD-based display system 200, according to a preferred embodiment of the present invention. The display system 200 includes a spatial light modulator, DMD 205. The DMD 205 includes a large number of movable mirrors that pivot about an axis to reflect light from a light engine 210 either onto a display plane 215 or away from the display plane 215. An application specific integrated circuit (ASIC) 220 may control the operation of the DMD 205 and the light engine 210. For example, the ASIC 220 may issue commands to load image data into the DMD 205, move the movable mirrors of the DMD 205 into position based on the image data, command the light engine 210 to produce light of specific duration, sequence, intensity, wavelength, and so forth. A front end section 225 may provide functions such as converting analog input signals into digital, Y/C separation, automatic chroma control, automatic color killer, and so forth.

Because the display system 200 is a manufactured device, it has certain manufacturing variations in the various components of the display system 200. The variations in the components of the display system 200 are especially evident in the light engine 210 of the display system 200, where, due to manufacturing variations, light produced by the light engine 210 may not be the same (or substantially the same) as the light produced by a golden projector, on which the display system 200 is based. Therefore, without compensating for the variations, the images produced on the display plane 215 may have an appearance that is different from the intended appearance based on the golden projector.

A sensor 230, preferably an optoelectric sensor, either attached to the display plane 215 or positioned near the display plane 215, may measure light reflecting from the DMD 205 onto the display plane 215. Alternatively, the sensor 230 may be positioned to measure light reflecting from the DMD 205 away from the display plane 215. The measured light may provide information about the chromatic characteristics of the light being displayed on the display plane 215. According to a preferred embodiment of the present invention, the sensor 230 may measure a color's chromatic information in the xy color space. For example, the sensor 230 may provide a measured red color's chromatic information in the form (red x, red y, red intensity). The information from the sensor 230 may be provided to the ASIC 220, wherein the information may be used to provide compensation in the commands provided to the light engine 210 by the ASIC 220 so that the light on the display plane 215 has chromatic characteristics that more closely match the desired chromatic characteristics of the golden projector.

Figure 2B:
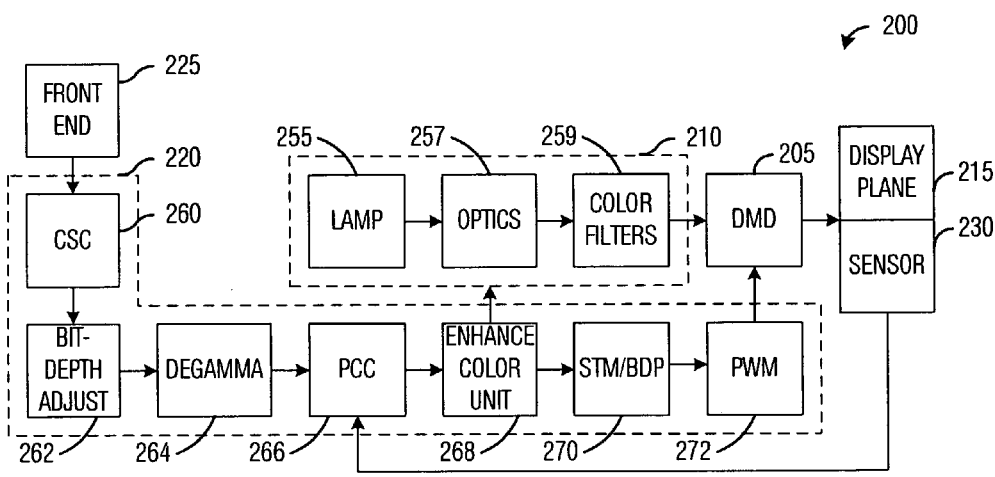

With reference now to FIG. 2b, there is shown a more detailed block diagram of DMD-based display system 200, according to a preferred embodiment of the present invention. The block diagram shown in FIG. 2b provides a detailed view of several components of the display system 200, including the light engine 210 and the ASIC 220. The light engine 210, which may be responsible for producing light in the form of sequences of colors based on commands provided by the ASIC 220, may include a lamp 255 that generates the light used by the display system 200. The lamp 255 may be a wideband source, for example, an electric arc lamp, or multiple narrowband sources, such as light-emitting diodes or laser diodes. A wideband source may produce white (or near white) light, while narrowband sources may produce light within a specific spectrum and will typically have a specific color. A lamp 255 with narrowband sources often will have multiple individual light elements, each capable of producing light within a specific narrow band.

The light engine 210 also may include an optics section 257, which may include optical lenses that may be used to focus the light produced by the lamp 255. The optics section 257 also may include integrating rods, for example, which may guide or mix the light from the lamp 255. The light engine 210 also may include color filters 259. In a typical display system 200, the color filter 259 may be implemented as a rotating color wheel, where the color wheel includes multiple segments of different colors. As the color wheel rotates, the segments filter the light from the lamp 255, producing light of a desired color.

If the lamp 255 uses a wideband source, color filters 259 may be necessary for the light engine 210 to produce light of the desired colors. When the lamp 255 is using narrowband sources, the color filters 259 may not be necessary if the narrowband sources are capable of producing light with the desired colors. The color filters 259, however, may still be necessary to produce the desired colors if the narrowband sources are not capable of doing so on their own.

The ASIC 220 may include a color space conversion unit (CSC) 260, which may convert an input signal's color space into a color space used by the display system 200. For example, the input signal may be in the YUV color space and the CSC 260 may convert the input signal into an RGB color space. The ASIC 220 also may include a bit-depth adjust unit 262, which may process the input signal and alter the images in the input signal to increase the bit-depth of the images, which may improve the image quality of the display system 200. A degamma unit 264 may remove any corrections provided to compensate for a CRT's nonlinear signal-to-light characteristics. A primary color correction unit (PCC) 266 may perform color corrections for the colors used in the display system 200, such as red, green, blue, cyan, yellow, magenta, and white. The PCC 266 may perform the color correction between the measured colors (measured by the sensor 230), the desired colors (the intended colors), and the nominal colors (the colors of the golden projector corresponding to the measured colors). A detailed description of a PCC 266 may be found in co-assigned U.S. Pat. No. 6,594,387, entitled "Enhanced Color Correction," granted Jul. 15, 2003, which U.S. Patent is incorporated herein by reference.

An enhance color unit 268 may map an input RGB value to an output gained RGB value that permits the turning on of additional bit-weights of color. Examples of the enhance color unit are the BrilliantColor™ units used in many Texas Instruments DMD-based microdisplays. The turning on of the additional bit-weights may increase the overall brightness of the resulting image. A detailed description of the operation of the PCC 266 and the enhance color unit 268 in conjunction with the information provided by the sensor 230 is provided below.

A spatial temporal multiplexing/boundary dispersion unit (STM/BDP) 270 may use dithering techniques to increase the effective bit depth resolution of the system, and may reduce boundary artifacts created when pixel codes cross specific boundaries, such as boundaries that create pulse width modulation temporal contouring artifacts and slight linearity or chrominance boundaries due to turning on spoke-bit-groups. Finally, a pulse-width modulator unit (PWM) 272 may pulse-width-modulate commands/data before providing them to the DMD 205.

Figure 2C:
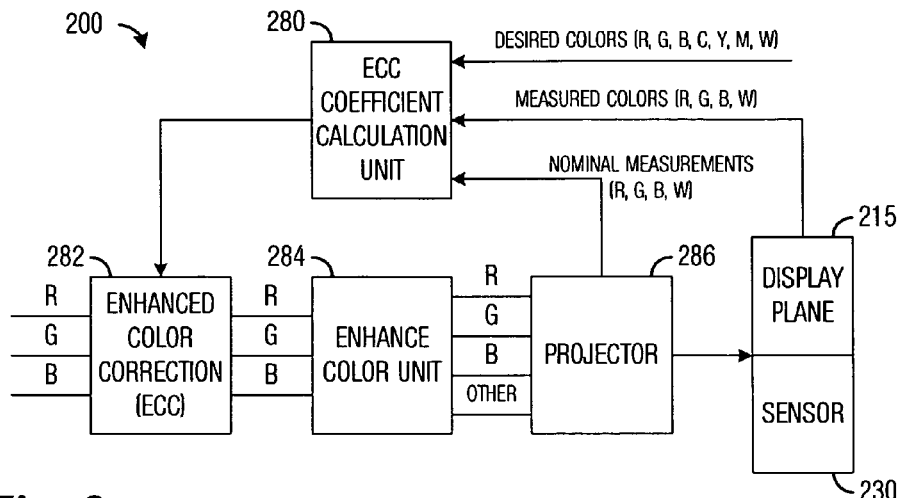

With reference now to FIG. 2c, there is shown a block diagram illustrating color information flow in a portion of the DMD-based display system 200, according to a preferred embodiment of the present invention. The system 200 includes an enhanced color correction (ECC) coefficient calculation unit 280, which may have as inputs measured color information as provided by the sensor 230. For example, the sensor 230 may provide color information for colors such as R, G, B, and white (W), all preferably measured near the display plane 215. Additionally, the ECC coefficient calculation unit 280 may have as input nominal color information provided by a projector 286. The projector 286 may be a logical grouping of several components of the display system 200, and may include the DMD 205, the light engine 210, and several components of the ASIC 220, such as the STM/BDP unit 270, and the PWM unit 272. The nominal color information comprises color information for the reference display system (for example, the golden projector) and may contain color information for colors such as R, G, B, and W. Another source of color information for the ECC coefficient calculation unit 280 may be desired color information. Desired color information may be input by the manufacturer of the display system 200 or users and/or technicians and may be color information pertaining to colors that the manufacturer, users, technicians, and so forth, want the display system 200 to produce. The desired color information may be in the form of xy chromaticity for colors such as R, G, B, W, cyan (C), yellow (Y), and magenta (M), for example.

The ECC coefficient calculation unit 280 may use the desired color information, the measured color information, and the nominal color measurement information to calculate color correction coefficients that may be used by an ECC unit 282. According to a preferred embodiment of the present invention, the ECC coefficient calculation unit 280 and the ECC unit 282 may be a part of the PCC 266 and may be hardware, software, or firmware implementations of algorithms. The ECC unit 282 may utilize the color correction coefficients to correct color values (for example, provided in RGB format) provided by other components of the ASIC 220, such as the CSC 260, the bit-depth adjust unit 262, and the degamma unit 264.

The color corrected color values, still in an RGB format, may be processed by an enhance color unit 284, implemented in hardware, software, or firmware, for example. The enhance color unit 284 may map the color corrected RGB values to output gained RGB values, along with other color information, such as C, Y, M, and W color information. The output of the enhance color unit 284 may be provided to the projector 286 to display on the display plane 215.

The mapping of the input RGB value to the output gained RGB value by the enhance color unit 268 may be performed through the use of a three-dimensional look-up table (LUT), with the input RGB value being used to index into the table to retrieve the output gained RGB value. Three-dimensional LUTs are created for a given color sequence and color filter (color wheel) on a nominal display system (e.g., the golden projector), and a separate three-dimensional LUT may be used for each unique color sequence. The three-dimensional LUT also may take into consideration the information provided by the sensor 230 and processed by the PCC 266 to provide color correction to compensate for manufacturing variances in the display system 200.

Descriptions of the DMD, DMD fabrication, and DMD-based display systems may be found in greater detail in the following co-assigned U.S. Patents: U.S. Pat. No. 4,566,935, issued Jan. 28, 1986, entitled "Spatial Light Modulator and Method," U.S. Pat. No. 4,615,595, issued Oct. 7, 1986, entitled "Frame Addressed Spatial Light Modulator," U.S. Pat. No. 4,662,746, issued May 5, 1987, entitled "Spatial Light Modulator and Method," U.S. Pat. No. 5,061,049, issued Oct. 29, 1991, entitled "Spatial Light Modulator and Method," U.S. Pat. No. 5,083,857, issued Jan. 28, 1992, entitled "Multi-Level Deformable Mirror Device," U.S. Pat. No. 5,096,279, issued Mar. 17, 1992, entitled "Spatial Light Modulator and Method," and U.S. Pat. No. 5,583,688, issued Dec. 10, 1996, entitled "Multi-Level Digital Micromirror Device," which patents are hereby incorporated herein by reference.

Figure 3:
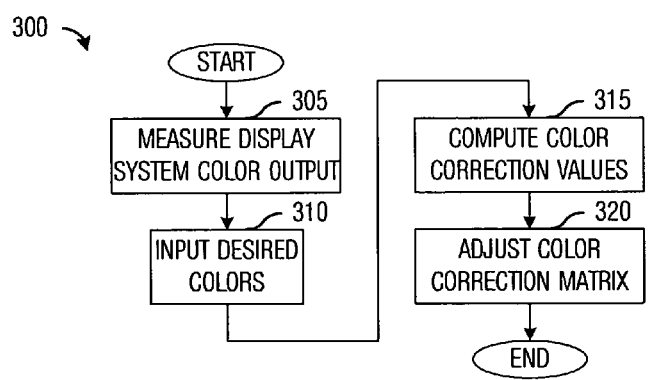
FIG. 3 is a flow chart illustrating the adjusting of the color space of a display system, according to a preferred embodiment of the present invention.

With reference now to FIG. 3, flow chart 300 illustrates the adjusting of a display system so that it may operate in a color space of a golden projector, according to a preferred embodiment of the present invention. The sequence of events in flow chart 300 may begin during the manufacture and test of the display system. During manufacture and test, the display system may be put into a test mode where it produces light of specified color(s). In step 305, a sensor, such as the sensor 230, may measure the color output of the display system. According to a preferred embodiment of the present invention, the information may be in the x, y color space. This measured color information may be stored in a memory in the display system or it may be stored in a display system test apparatus and associated with the display system.

In step 310, during or after manufacture and test, a set of desired colors may be provided to the display system. The desired colors also may be provided in the x, y color space.

The desired color information may be provided by the manufacturer of the display system. Alternatively, the end user (the owner, for example) of the display system, a person performing a calibration of the display system, and the like, also may enter the desired colors. In step 315, the measured color information and the desired color information then may be used to compute a series of color correction values. In step 320, the color correction values may be used to modify a color correction matrix that is used by the display system's PCC 266 and enhance color unit 268. A detailed discussion of the computation of the color correction values and the adjustment to the color correction matrix is provided below.

The modification to the color correction matrix of the PCC 266 and the enhance color unit 268 allows the display system to utilize color sequence information designed and tested for the golden projector on its own light engine, which, due to manufacturing variations, may produce light of different chromatic characteristics. Therefore, modifications to the carefully created color sequence information generally are not needed.

With reference now to FIG. 4a, flow chart 400 illustrates the creation of a three-dimensional look-up table (LUT) for use in the PCC 266 and enhance color unit 268 (FIG. 2b) in performing the mapping of the input RGB value to the output RGB value, according to a preferred embodiment of the present invention. The creation of the three-dimensional LUTs used by the enhance color unit 268 may begin with a building and loading of color sequences in step 405. Color sequences contain information such as the colors available in the sequence, the order of the colors, the intensity of the light at each of the colors, the location of the spokes, and so forth. Then, for a given color sequence, all non-RGB bits, such as C, Y, M, and white bits, may be calibrated in step 410. This calibration procedure, either by visual means or using a color meter system, finds a match in color and brightness for each of the non-RGB colors using only RGB colors.

Once calibration of the non-RGB bits for the color sequence is complete, tables that are to be used for dynamic range adjust (DRA) may be built in step 415. DRA functions by substituting C, Y, M, and white bits when RGB bits are beyond their dynamic range to bring the overall dynamic range back to specifications. The three-dimensional LUT may then be built in step 420. The creation of the three-dimensional LUT may be partitioned into two parts: a first part may include the calculation of intermediate values and a second part may include color correction calculations. A detailed discussion of the two components of the building of a three-dimensional LUT is provided below. With the three-dimensional LUT built, the calibration of non-RGB bits, building of the DRA table, and the building of the three-dimensional LUT may be repeated for all remaining color sequences with calibration changes for non-RGB bits (step 425). Additionally, if compensation for the lamp 255 (FIG. 2b) deterioration due to aging is desired, the calibration of non-RGB bits, building of the DRA table, and the building of the three-dimensional LUT may be repeated for the various lamp deterioration models.

With reference now to FIG. 4b, flow chart 450 illustrates in step 454 using sensor 230 to measure the RGB colors for the nominal display system. According to a preferred embodiment of the present system, the measured RGB colors may be in the format (x, y, intensity) for each of the three RGB colors, with an additional measurement for full-on white (all RGB colors on simultaneously). For the color R, the measured information may be expressed as $nx_r, ny_r, L_r$. According to a preferred embodiment of the present invention, the measurements of the RGB colors preferably are made with color correction turned off.

Using the measured RGB color data, a color conversion matrix Ncm (nominal color matrix) may be calculated in step 456. The calculation of the matrix Ncm may involve the calculation of several other values, including additional input chromaticities, intensity of white, and input tristimulus values. The additional values to be calculated generally are expressed as follows.

Input chromaticities:

$$nz_r=1-nx_r-ny_r, nz_g=1-nx_g-ny_g, nz_b=1-nx_b-ny_b, nz_w1=-nx_w-ny_w$$

White intensity:

$$L_w=L_r+L_g+L_b$$

Input tristimulus values:

$$Xrn=nx_r/ny_r \cdot L_r/L_w, Yrn=L_r/L_w, Zrn=nz_r/ny_r \cdot L_r/L_w$$

$$Xgn=nx_g/ny_g \cdot L_g/L_w, Ygn=L_g/L_w, Zgn=nz_g/ny_g \cdot L_g/L_w$$

$$Xbn=nx_b/ny_b \cdot L_b/L_w, Ybn=L_b/L_w, Zbn=nz_b/ny_b \cdot L_b/L_w$$

The matrix Ncm may be expressed as:

$$Ncm = \begin{bmatrix} Xrn & Xgn & Xbn \\ Yrn & Ygn & Ybn \\ Zrn & Zgn & Zbn \end{bmatrix}.$$

After the calculation of the matrix Ncm, the color coordinates of the color B (blue), bxn and byn, from the nominal display system may be stored in step 458. According to a preferred embodiment of the present invention, due to the design of the nominal display system, the B color point is used to reference the white point of the nominal display system. Alternatively, it may be possible to use one of the other two primary colors R or G in place of B.

With the matrix Ncm calculated and the color coordinates of the color B stored, a matrix Cxyi may be generated in step 460. The matrix Cxyi may be used to convert a color value x, y from the x, y color space to an index ix and iy that may be used to address a Txyn LUT. The matrix Cxyi may be expressed as (for the 16×16 size of Txyn):

$$Cxyi = \frac{1}{nx_g \cdot ny_b - nx_g \cdot ny_r + nx_b \cdot ny_r + nx_r \cdot ny_g - nx_r \cdot ny_b - nx_b \cdot ny_g} \begin{bmatrix} 15(ny_g - ny_r) & 15(nx_r - nx_g) \\ 15(ny_g - ny_b) & 15(nx_b - nx_g) \end{bmatrix}$$

The Txyn LUT may be defined from the color gamut of the nominal system and the color coordinates of the color B (bxn and byn) may be chosen as the (0, 0) location of the Txyn LUT. Alternatively, it may be possible to use the color coordinates of the other primary colors R and G as the (0, 0) location of the Txyn LUT.

In step 462, the Txyn LUT may be generated. According to a preferred embodiment of the present invention, the Txyn LUT may be generated by looping over ix and iy, with the coordinate (ix, iy) being converted to chromaticity coordinate (x, y) with the use of the matrix iCxyi (the inverse of the matrix Cxyi). The various faces of the three-dimensional LUT may be searched for the closest match to (x, y) and multiple values, preferably three, from around this match to (x, y) may be used to interpolated the input RGB values that will produce the (x, y) output. The gain value, which may be stored at location (ix, iy) may be computed as R/255, G/255, B/255.

Figure 5A:
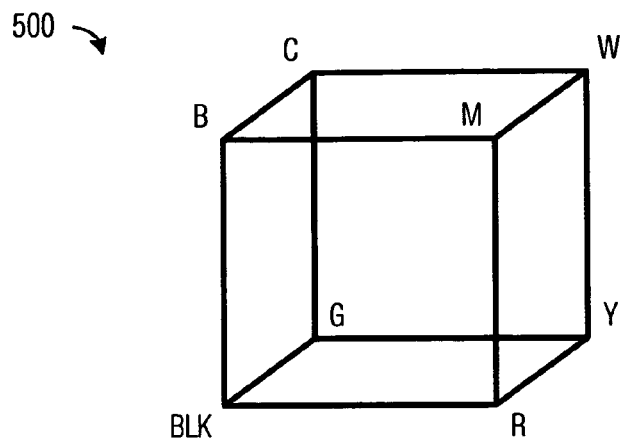
FIGS. 5a and 5b are graphical representations of the three-dimensional look-up table, according to a preferred embodiment of the present invention.
Figure 5B:
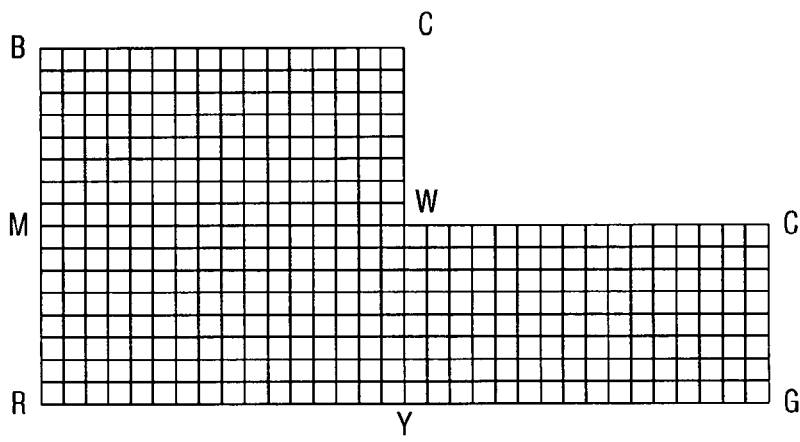

With reference now to FIGS. 5a and 5b, there are shown graphical conceptual and practical layouts of the three-dimensional LUT, according to a preferred embodiment of the present invention. The diagram shown in FIG. 5a illustrates a conceptual view 500 of the three-dimensional LUT. The conceptual view 500 may be a cube shape with a color at each corner of the cube shape. The faces of the three-dimensional LUT may be flattened to help simplify the search for x, y color coordinates, with each location on the flattened space corresponding to a location of the face of the three-dimensional LUT, as shown in FIG. 5b.

Figure 6A:
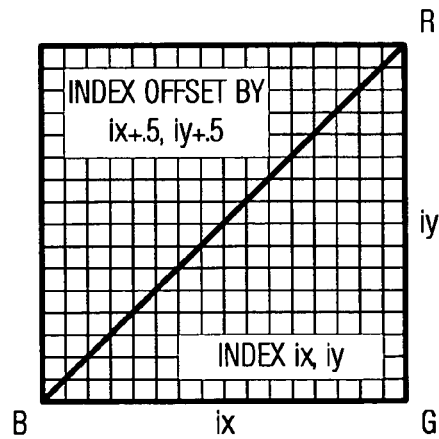
FIGS. 6a and 6b are graphs of a two-dimensional look-up table, according to a preferred embodiment of the present invention.
Figure 6B:
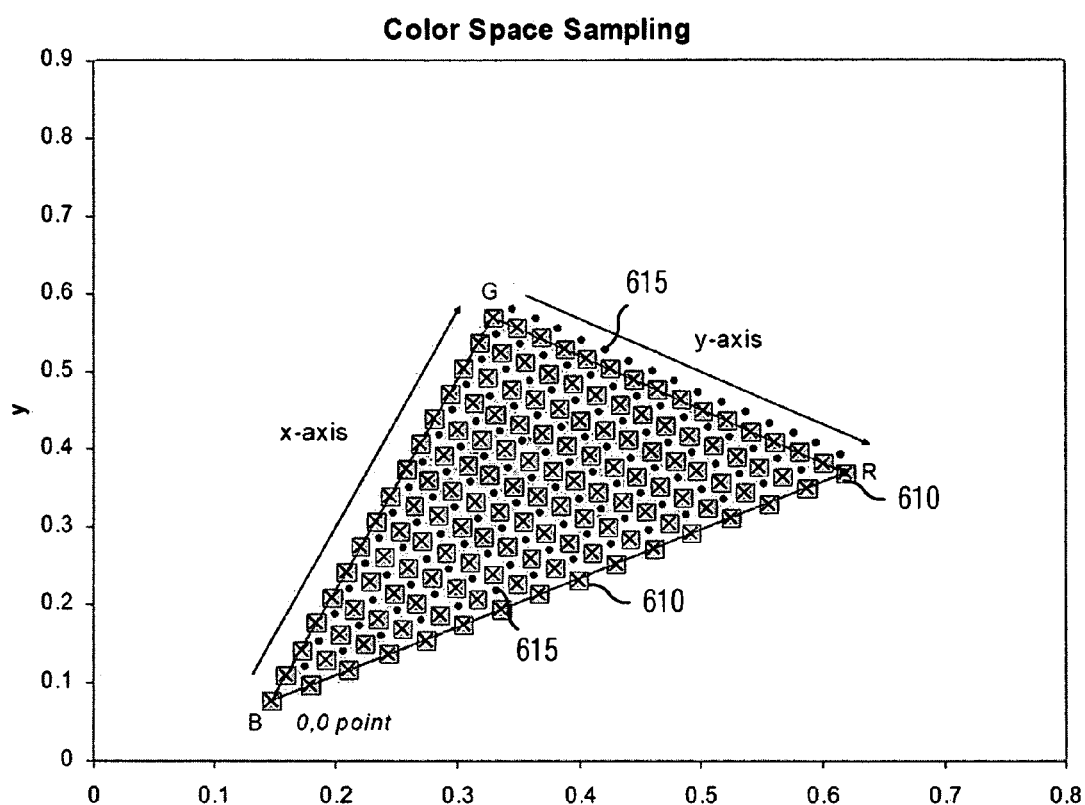

With reference now to FIGS. 6a and 6b, there is shown a graphical view of the Txyi two-dimensional LUT and an enhanced Txyi two-dimensional LUT with increased resolution, according to a preferred embodiment of the present invention. In the graphical view of the Txyi two-dimensional LUT, blue may be placed at the (0, 0) location, green may be mapped to the (15, 0) location and red may be mapped to the (15, 15) location. With this initial layout, only half of the matrix (the lower triangle) would be used. Therefore, the upper triangle is used to store ½ steps of data, doubling the number of samples of the color space. The Txyi two-dimensional LUT may utilize a special indexing method, wherein a lower triangular region is indexed by (ix, iy), while an upper triangular region (or when iy>ix) represents real indices of (iy+0.5, ix+0.5). The use of the special indexing method in the upper triangular region of the Txyi two-dimensional LUT can increase the resolution of the Txyi two-dimensional LUT. The diagram shown in FIG. 6b illustrates a view of the Txyi two-dimensional LUT folded along a diagonal connecting points B and R. Since points in the upper triangular region are indexed with an offset of 0.5, the points in the upper triangular region and points in the lower triangular region do not line up. Points in the lower triangular region, such as points 610, are displayed as being slightly offset from points in the upper triangular region, such as points 615.

With reference now back to FIG. 4b, the corresponding x,y color coordinate for a given location may then be found by the following:

if $(iy > ix)$ then $$\begin{bmatrix} x \\ y \end{bmatrix} = iCxyi \cdot \begin{bmatrix} iy + .5 \\ ix + .5 \end{bmatrix} + \begin{bmatrix} nx_b \\ ny_b \end{bmatrix}$$

else $$\begin{bmatrix} x \\ y \end{bmatrix} = iCxyi \cdot \begin{bmatrix} iy \\ ix \end{bmatrix} + \begin{bmatrix} nx_b \\ ny_b \end{bmatrix}$$

The computation of the Txyn LUT in step 462 may be repeated for each desired white peaking factor (step 464), with the white peaking being applied to the three-dimensional LUT gain factors using the expression g'=(g−1)*wp+1, where g is the three-dimensional LUT gain factor, g' is the adjusted gain factor, and wp is the white peaking factor, which may range from 0 to 1. The expression may be applied to each of the RGB gains over the entire three-dimensional LUT.

The computations used to generate the three-dimensional LUT, the Txyn LUT, Ncm matrix, and the Cxyi matrix preferably may be performed during the manufacture and test of the nominal display system and stored in a memory located in the nominal display system for subsequent use. Not all of the computations, however, must be performed prior to use.

Figure 4C:
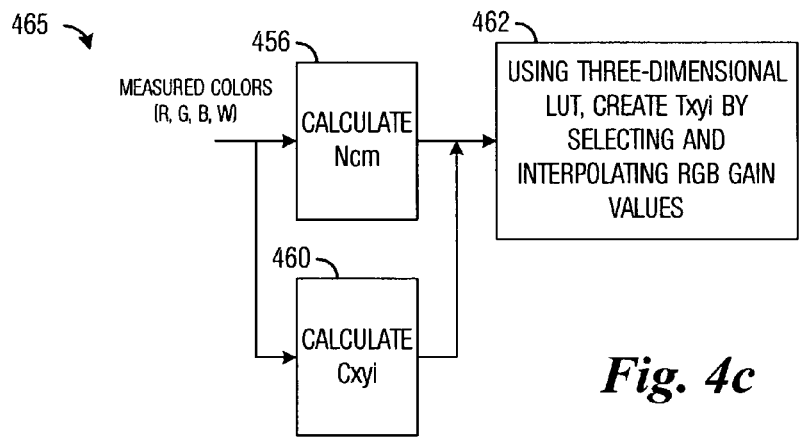

With reference now to FIG. 4c, there is shown a flow chart 465 illustrating a high-level view of the building of a three-dimensional LUT based on the nominal system, for use in the PCC 266 and the enhance color unit 268, which building includes the calculation of intermediate values. Using measured color information for the nominal system, such as provided by the sensor 230, the color conversion matrix Ncm may be calculated in step 456 and the matrix Cxyi may be calculated in step 460. Using both the matrix Ncm and the matrix Cxyi, the Txyi two-dimensional LUT may be calculated in step 462.

With reference now to FIG. 4d, there is shown a flow chart 470 illustrating the building of a three-dimensional LUT for use in the PCC 266 and the enhance color unit 268, wherein the building includes the color correction value calculations, according to a preferred embodiment of the present invention. Because the intermediate values were computed based on values for the nominal display system, the desired values then should be mapped back to the nominal display system for the measured display system. The calculation of the color correction values may begin with the computation of matrix Tcm, which defines the target color system (step 472). The matrix Tcm may be computed as follows.

Calculate additional input chromaticities:

$cz_{ri}=1-cx_{ri}-cy_{ri}$ $cz_{gi}=1-cx_{gi}-cy_{gi}$ $cz_{bi}=1-cx_{bi}-cy_{bi}$
$cz_{wi}1=-cx_{wi}-cy_{wi}$

Calculate input tristimulus values:

$Xri=cx_{ri}/cy_{ri} \cdot L_{ri}/L_{wi}$ $Yri=L_{ri}/L_{wi}$ $Zri=cz_{ri}/cy_{ri} \cdot L_{ri}/L_{wi}$ $Xgi=cx_{gi}/cy_{gi} \cdot L_{gi}/L_{wi}$ $Ygi=L_{gi}/L_{wi}$ $Zgi=cz_{gi}/cy_{gi} \cdot L_{gi}/L_{wi}$ $Xbi=cx_{bi}/cy_{bi} \cdot L_{bi}/L_{wi}$ $Ybi=L_{bi}/L_{wi}$ $Zbi=cz_{bi}/cy_{bi} \cdot L_{bi}/L_{wi}$ Calculate target projector RGB color system matrix:

$$\begin{bmatrix} X \\ Y \\ Z \end{bmatrix} = \begin{bmatrix} Xri & Xgi & Xbi \\ Yri & Ygi & Ybi \\ Zri & Zgi & Zbi \end{bmatrix} \begin{bmatrix} R \\ G \\ B \end{bmatrix}$$

$$\begin{bmatrix} X \\ Y \\ Z \end{bmatrix} = Tcm \begin{bmatrix} R \\ G \\ B \end{bmatrix}$$

Calculate inverse color system matrix:

$$\begin{bmatrix} R \\ G \\ B \end{bmatrix} = \begin{bmatrix} Rxi & Ryi & Rzi \\ Gxi & Gyi & Gzi \\ Bxi & Byi & Bzi \end{bmatrix} \begin{bmatrix} X \\ Y \\ Z \end{bmatrix}$$

-continued $$Tcm^{-1} = \begin{bmatrix} Rxi & Ryi & Rzi \\ Gxi & Gyi & Gzi \\ Bxi & Byi & Bzi \end{bmatrix}$$

$$= \frac{1}{(Xri \cdot Ygi \cdot Zbi - Xri \cdot Ybi \cdot Zgi - Xgi \cdot Yri \cdot Zbi + Xbi \cdot Yri \cdot Zgi + Xgi \cdot Ybi \cdot Zri + Xbi \cdot Ygi \cdot Zri)} \cdot$$

$$\begin{bmatrix} Ygi \cdot Zbi - Ybi \cdot Zgi & Xbi \cdot Zgi - Xgi \cdot Zbi & Xgi \cdot Ybi - Xbi \cdot Ygi \\ Ybi \cdot Zri - Yri \cdot Zbi & Xri \cdot Zbi - Xbi \cdot Zri & Xbi \cdot Yri - Xri \cdot Ybi \\ Yri \cdot Zgi - Ygi \cdot Zri & Xgi \cdot Zri - Xri \cdot Zgi & Xri \cdot Ygi - Xgi \cdot Yri \end{bmatrix}$$

A matrix Ctn, which maps from the target display system back to the nominal display system, also may be calculated. The matrix Ctn may be expressed as:

$$Ctn = Ncm \cdot Tcm^{-1}.$$

The above description applies in a similar fashion to a multiprimary system. In the case of a system with more than three primaries, the matrices Ncm and Tcm will increase from having a dimensionality of 3×3 to 3×K where K denotes the number of primaries in the multiprimary system. For example, for a system with five primaries, with the additional color primaries denoted by c1 and c2, Ncm is given by:

$$\begin{bmatrix} X \\ Y \\ Z \end{bmatrix} = \begin{bmatrix} Xrn & Xgn & Xbn & Xc1n & Xc2n \\ Yrn & Ygn & Ybn & Yc1n & Yc2n \\ Zrn & Zgn & Zbn & Zc1n & Zc2bn \end{bmatrix} \begin{bmatrix} R \\ G \\ B \\ C_1 \\ C_2 \end{bmatrix}$$

$$Ncm = \begin{bmatrix} Xrn & Xgn & Xbn & Xc1n & Xc2n \\ Yrn & Ygn & Ybn & Yc1n & Yc2n \\ Zrn & Zgn & Zbn & Zc1n & Zc2bn \end{bmatrix}$$

and similarly, Tcm is defined as the system color matrix for the target system. Ctn is then defined as:

$$Ctn = NcmK_{pp}Tcm^t[TcmK_{pp}Tcm^t]^{-1}$$

wherein a superscript 't' denotes a transpose operator, a superscript of '−1' denotes an inverse operation, and $K_{pp}$ denotes a correlation matrix that may be computed using an expectation operator on all possible device values in the LUT. For example, if all device values were equally likely, $K_{pp}$ would be defined as an identity matrix, which reduces the above equation to one that uses the pseudo-inverse operator:

$$Ctn = NcmTcm^t[TcmTcm^t]^{-1}.$$

The desired x, y coordinates then may be transformed to the nominal x, y coordinates in step 474. For each desired x, y coordinate, the transformation to nominal x, y coordinates may follow the following operations.

Convert the desired $cx_0$, $cy_0$ into $CX_0$, $CY_0$, $CZ_0$, wherein:

$$CX_0 = cx_0/cy_0 \quad CY_0 = 1 \quad CZ_0 = (1 - cx_0 - cy_0)/cy_0.$$

Convert $CX_0$, $CY_0$, $CZ_0$ from target space to nominal space $NX_0$, $NY_0$, $NZ_0$, wherein:

$$\begin{bmatrix} NX_0 \\ NY_0 \\ NZ_0 \end{bmatrix} = Ctn \cdot \begin{bmatrix} CX_0 \\ CY_0 \\ CZ_0 \end{bmatrix} \text{ with } Ctn = Ncm \cdot Tcm.$$

Convert $NX_0$, $NY_0$, $NZ_0$ to nx, ny, wherein:

$$nx = \frac{NX_0}{NX_0 + NY_0 + NZ_0} \text{ and } ny = \frac{NX_0}{NX_0 + NY_0 + NZ_0}.$$

The nominal x, y coordinates transformed from the desired x, y coordinates in step 474 then may be converted into indexed ix, iy coordinates using the matrix Cxyi in step 476. The conversion may be expressed as:

$$\begin{bmatrix} ixf \\ iyf \end{bmatrix} = Cxyi \cdot \begin{bmatrix} nx - bxn \\ ny - byn \end{bmatrix},$$

where bxn and byn are the color coordinates of the color blue in the nominal display system space.

In step 478, RGB gain values for the desired color may be looked up and potentially interpolated from the input of the Txyn LUT. Several methods may be used to perform the look-up and interpolation. A first method generally uses only one of the two sets of samples (the samples located in the lower triangular portion of the Txyn LUT or the samples located in the upper triangular portion of the Txyn LUT) and a second method generally utilizes both sets of samples. The first method may be computationally simpler but may have a larger error. The specific interpolation technique may be any one of those well known to one of ordinary skill in the art, such as barycentric coordinates, trilinear coordinates, and the like. The interpolation method also may provide special interpolation for points that are found to be on the boundaries of the Txyi space.

In step 480, the RGB gain values from the Txyn LUT (step 478) may be gain adjusted by a value that is provided by the user (e.g., the manufacturer of the display system) to produce Rgain, Ggain, and Bgain, which may be stored in an appropriate location in the color correction matrix after each value has been converted from a scaled integer to a floating point number. The transformation from the desired x, y coordinates to nominal x, y coordinates (step 474), transformation from nominal x, y coordinates to indexed x, y coordinates (step 476), the look-up and interpolation of the RGB gain values from the Txyn LUT (step 478), and the gain adjust, conversion into floating point numbers, and storage in the color correction matrix (step 480) may be repeated for each remaining color (step 482).

Figure 4E:
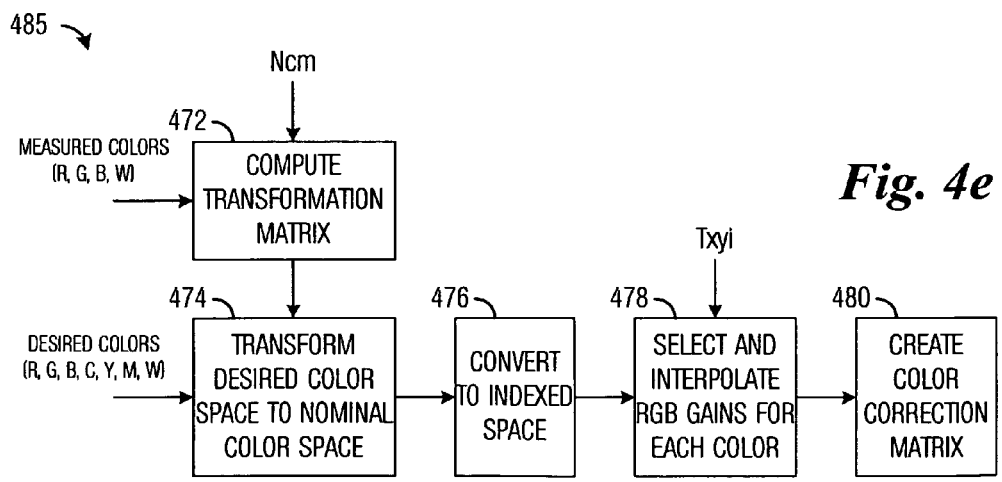

With reference now to FIG. 4e, there is shown a flow chart 485 illustrating a high-level view of the building of a three-dimensional LUT for use in the PCC 266 and the enhance color unit 268, wherein the building includes the color correction value calculations, according to a preferred embodiment of the present invention. Using measured color information and the matrix Ncm, the matrix Tcm may be computed in step 472. The matrix Tcm then may be used to convert the desired colors into the color space of the nominal display system in step 474, which may subsequently be converted into an indexed color space in step 476. The Txyi two-dimensional LUT may be computed using the three-dimensional LUT to select and interpolate RGB gains in step 478, which are used to create the color correction coefficients in step 480.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that preform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for color-correcting colors in a display system, the method comprising:
   measuring output color values of light output for the display system;
   receiving desired color values of desired colors;
   computing a color correction matrix based on the measured output color values and the desired color values, comprising:
      computing intermediate values based on nominal color values of a reference display system; and
      computing color correction values based on the measured color values, the desired color values, and the intermediate values; and
   modifying color commands to a light engine of the display system using the color correction matrix.

2. The method of claim 1, wherein the computing of the intermediate values comprises:
   creating a first look-up table for a calibrated color sequence;
   generating a color conversion matrix to convert color values from a first color space to a second color space, wherein the color conversion matrix is based on the measured color values;
   generating an indexing matrix to convert color values in the second color space to indexed color values;
   for each location (ix, iy) in a two-dimensional look-up table,
   selecting a first set of color values in a first color space that is closest in chromatic characteristics to a second set of color values in a second color space, wherein the second set of color values is an unindexed version of (ix, iy); and
   storing the second set of color values at location (ix, iy) in the two-dimensional look-up table.

3. The method of claim 2, wherein the selecting further comprises interpolating the first set of color values between two or more sets of color values around the second set of color values.

4. The method of claim 2, wherein the first look-up table comprises a three-dimensional look-up table stored as a two-dimensional memory array with each memory location corresponding to a location on a face of the three-dimensional look-up table and containing a color value in the second color space.

5. The method of claim 2, wherein the first color space comprises the RGB color space and the second color space comprises the xy color space.

6. The method of claim 1, wherein the computing of the color correction values comprises:
   generating a color transformation matrix for a selected color based on the measured color values;
   converting the desired color values into an indexed color space of the reference display system;
   selecting gain values in the first color space based on the indexed color space; and
   storing the gain values in the color correction matrix.

7. The method of claim 6, wherein there are multiple colors used in creating the color correction matrix, and wherein the converting, the selecting, and the storing are repeated for each remaining color.

8. The method of claim 6, wherein the storing is based on the selected color.

9. The method of claim 6, wherein the gain values are converted into floating point numbers prior to the storing.

10. The method of claim 6, wherein the converting comprises:
    converting the desired color values into a nominal color space; and
    converting the color values in the nominal color space into the indexed color space of the reference display system.

11. A method of manufacturing a display system, the method comprising:
    installing a light engine configured to generate multiple colors of light;
    installing a spatial light modulator in a light path of the multiple colors of light;
    installing a controller configured to control the light engine and the spatial light modulator;
    measuring output color values of a light output of the display system;
    receiving desired color values of desired colors;
    computing a color correction matrix based on the measured output color values and the desired color values, wherein the computing of the color correction matrix is based on chromatic properties of a reference display system; and
    storing the color correction matrix in a memory in the display system.

12. The method of claim 11 further comprising, prior to the measuring, placing the display system into a test mode.

13. The method of claim 11 further comprising, prior to the measuring, instructing the light engine to generate the light output.

14. A display system comprising:
    a light source to produce light responsive to received light commands;
    an array of light modulators configured to produce images on a display plane by modulating the light from the light source based on image data;
    a controller coupled to the array of light modulators and to the light source, the controller configured to process color information and to correct color values based on a reference color space;
    an optoelectric sensor coupled to the controller, the optoelectric sensor configured to provide to the controller chromatic information associated with the light from the light source;
    a color correction unit coupled to the optoelectric sensor, the color correction unit configured to compute color correction values based on the chromatic information provided by the optoelectric sensor; and an enhance color unit coupled to the color correction unit, the enhance color unit configured to boost color values of input color information to increase image brightness.

15. The display system of claim 14, wherein the color correction unit also computes color correction values based on chromatic information of a reference display system and chromatic information of desired colors.

16. The display system of claim 15, wherein the color correction unit modifies the light commands received by the light source using the computed color correction values to cause the display system produce light that is substantially chromatically equivalent to light produced by the reference display system.

17. The display system of claim 14, wherein the array of light modulators is a digital micromirror device.

* * * * *